United States Patent [19]
Farrow

[11] Patent Number: 5,267,767
[45] Date of Patent: Dec. 7, 1993

[54] BICYCLE FAIRING

[76] Inventor: Clarence Farrow, R.R. #3, Lakefield, Ontario, Canada, K0L 2H0

[21] Appl. No.: 774,088

[22] Filed: Oct. 9, 1991

[51] Int. Cl.$^5$ .................... B62J 17/04; B62J 17/06
[52] U.S. Cl. ................... 296/78.1; 224/316; 280/288.2
[58] Field of Search .............. 280/281.1, 288.2, 288.3; 296/78.1; 224/316, 30 R

[56] References Cited

U.S. PATENT DOCUMENTS

| | | | |
|---|---|---|---|
| 1,042,305 | 10/1912 | Wright | 296/78.1 |
| 1,135,337 | 4/1915 | Bunau-Varilla | 296/78.1 |
| 1,356,874 | 10/1920 | Moran | 296/78.1 |
| 2,045,983 | 6/1936 | Ferrigno | 296/78.1 |
| 3,891,265 | 6/1975 | Blackburn | 296/78.1 |
| 4,534,578 | 8/1985 | Keller | 296/78.1 |
| 4,655,497 | 4/1987 | Mallett | 296/78.1 |
| 4,790,555 | 12/1988 | Nobile | 296/78.1 |
| 4,813,583 | 3/1989 | Carpenter | 224/30 R |
| 5,094,502 | 3/1992 | Mote | 296/78.1 |

FOREIGN PATENT DOCUMENTS 80036  6/1919  Switzerland ............ 296/78.1

*Primary Examiner*—Mitchell J. Hill

[57] ABSTRACT

Disclosed herein is a fairing for a bicycle of the type having a front wheel, a forked steering column and a pair of handle bars, the fairing comprising a shroud, the shroud having a leading edge and a pair of walls extending rearwardly and outwardly on respective sides of the leading edge, the leading edge extending from a region near the handle bars to a region near the lowermost edge of the front wheel, the shroud having a sufficient height to shield the head of a rider in 'one' position and a lower edge that is sufficiently low to shield the front wheel, thereby reducing the aerodynamic friction encountered by the bicycle.

4 Claims, 6 Drawing Sheets

BICYCLE FAIRING

BACKGROUND OF THE INVENTION

1. Field of the Invention

The present invention relates to bicycle fairings.

2. Description of Related Art

The increasing popularity of the sport of cycling has led to numerous efforts to increase the speed of bicycles, including lighter construction and reduced aerodynamic drag. The latter has led to aero shaped helmets, low friction skinned suits and the like.

Several attempts have also been made to reduce drag by the use of a bicycle fairing. However, those efforts have not yet resulted in a product that satisfies the need of the modern cyclist.

SUMMARY OF THE INVENTION

It therefore is an object of the presently invention to provide just such a fairing.

Briefly stated the invention involves a fairing for a bicycle of the type having a front wheel, a forked steering column and a pair of handle bars, the fairing comprising a shroud, the shroud having a leading edge and a pair of walls extending rearwardly and outwardly on respective sides of the leading edge, the leading edge extending from a region near the handle bars to a region near the lowermost edge of the front wheel, the shroud having a sufficient height to shield the head of a rider in 'one' position and a lower edge that is sufficiently low to shield the front wheel, thereby reducing the aerodynamic friction encountered by the bicycle.

BRIEF DESCRIPTION OF THE DRAWINGS

Preferred embodiments of the present invention will be described, by way of example only, as illustrated in the appended drawings in which.

DESCRIPTION OF THE PREFERRED EMBODIMENTS

Figure 1:
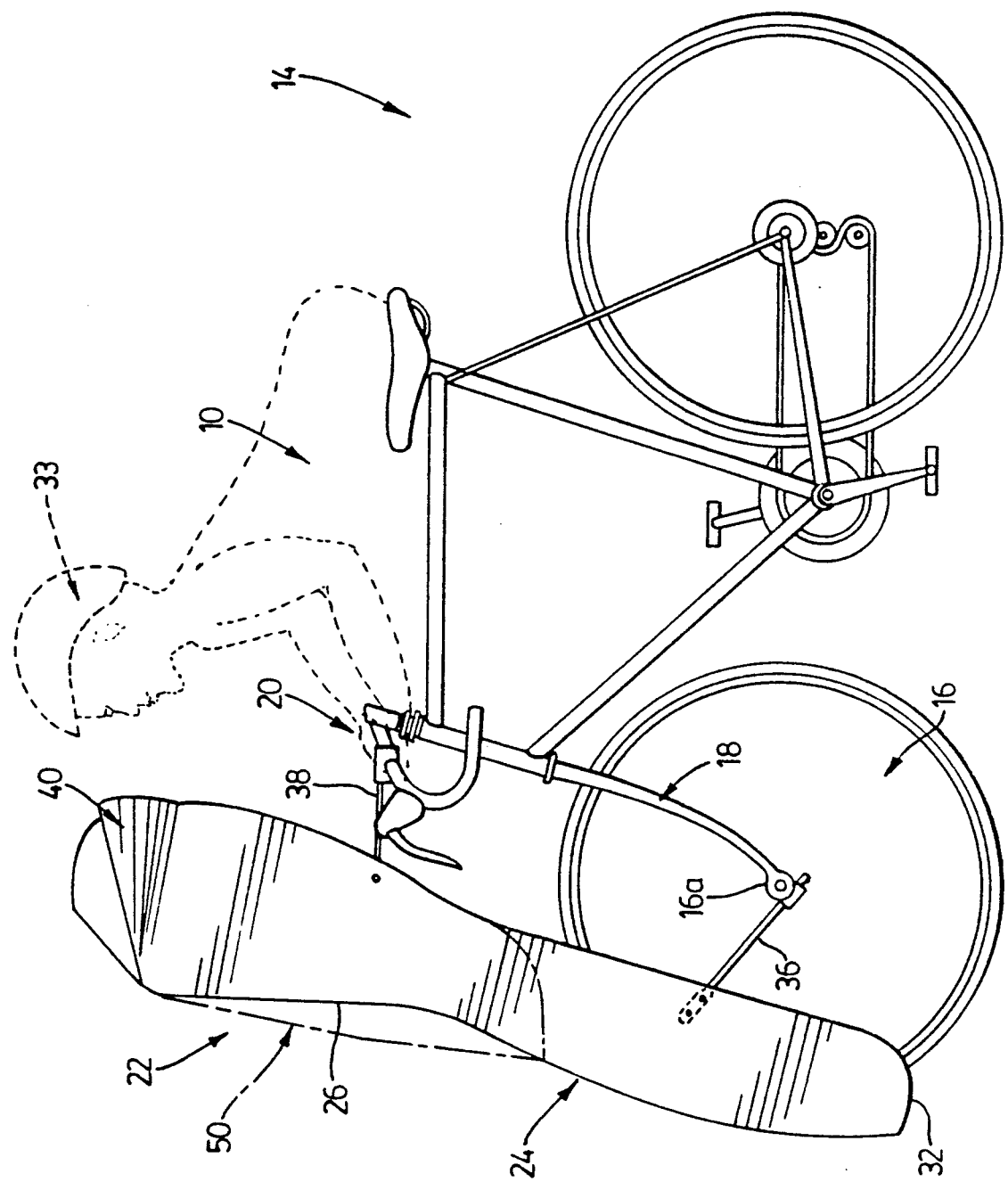
FIG. 1 is a side view of a bicycle.

Referring to the figures, there is provided a bicycle 10 having a front end 12 and a rear end 14. The bicycle 10 is of the conventional variety and will not be described further, except to say that its front end 12 includes a wheel 16 with an axle 16a, a forked steering column 18 and a set of handle bars 20.

Attached to the front end 12 is a fairing 22. The fairing 22 has a shroud 24 which is characterised by a leading edge 26 and a pair of relatively thin walls 28, 30 extending at a divergent angle rearwardly from the leading edge 26.

The shroud 24 has a lower edge 32 that extends below the height of the axle 16a and terminates a few inches above the height of the lowermost point of the wheel 16, that is a few inches above the ground surface when the bicycle 10 is in its upright position.

The shroud 24 has an upper edge 34 of the shroud 24 is arranged to be at approximately the same elevation as the lower edge 32 of the cyclist's helmet (shown in dashed lines at 33) when in the 'crouched' position.

The shroud 24 is attached to the front end 12 of the bicycle 10 in four locations, two of which involve the use of struts 36 connected to the side walls 28, 30 of the shroud 24 and extend rearwardly toward the ends of the axle 16a. Each strut 36 has a bored flange member 36a which fits onto the axle 16a and is retained on the axle 16a by a nut 36b. Another pair of struts 38 are attached to the shroud 24 and extend rearwardly to spaced locations on the cross bar 20a of the handle bar 20. Each strut terminates at a split block 38a which fits over the outer diameter of the cross bar 20a and is retained in place by way of threaded fasteners 38b or the like.

Figure 3A:
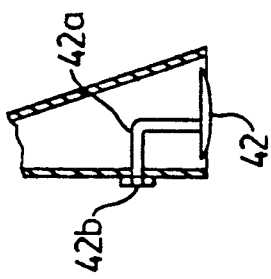
FIG. 3a is a sectional view taken on line 3a—3a of FIG. 3.

Extending laterally from either side of the shroud 24 in its upper region are a pair of mirror shrouds 40 containing a mirror 42. Each mirror 42 is fixed on one end of a right-angled support arm 42a, the other end of which is attached to the shroud as shown in FIG. 3a, by way of a fastener 42b thereby allowing a limited but satisfactory degree of adjustability to the preference of the cyclist. Other adjustment mechanism may also be used to support the mirror in the mirror shroud 40.

Figure 3B:
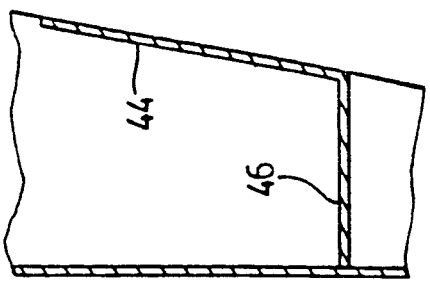
FIG. 3b is a sectional view taken on line 3b—3b of FIG. 3.
Figure 3:
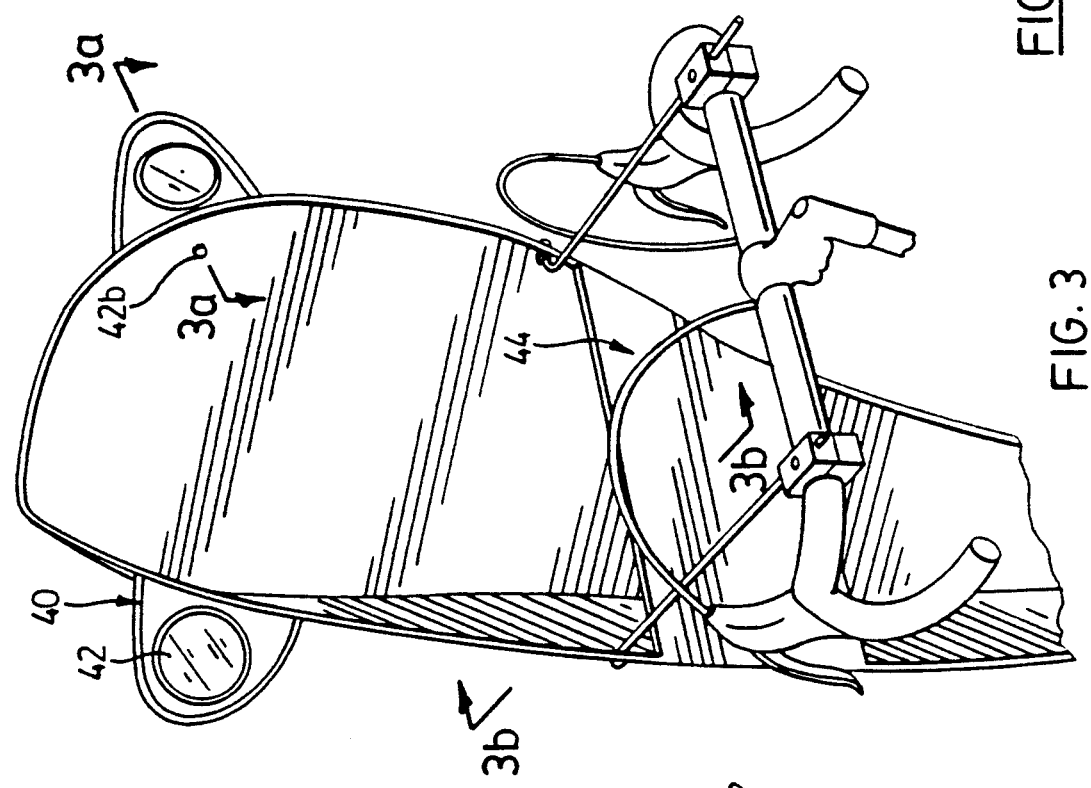
FIG. 3 is a fragmentary perspective view of the bicycle illustrated in FIG. 1.

A central panel illustrated at 44 is also provided to stiffen the shroud 24 and extends between the free edges of the two walls 28, 30. Referring to FIG. 3b, a further bottom panel 46 may be used, if desired, to form a carrying pocket bounded by the two walls 28, 30 and the central panel 44.

One particular feature of the fairing 22 is its leading edge 26 which enables the fairing 22 to cut the wind in a manner similar to the hull of a boat. In addition, the leading edge 26 has a 'knee' in its central region to permit the shroud 24 to be positioned tighter to the handle bars 20, if desired, while allowing sufficient spacing between the shroud 24 and the front wheel 16.

Figure 2A:
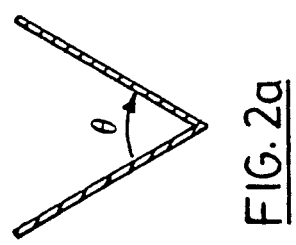
FIG. 2a is a sectional view taken on line 2a—2a of FIG. 2.
Figure 2:
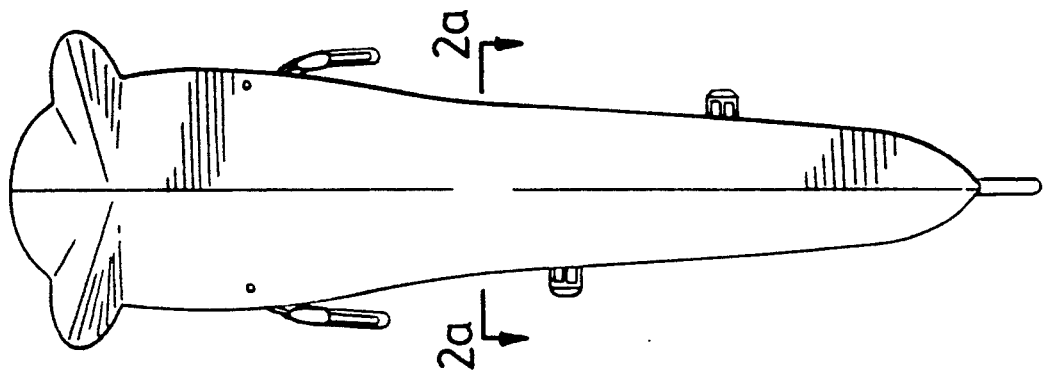
FIG. 2 is a frontal view of the bicycle illustrated in FIG. 1.
Figure 4:
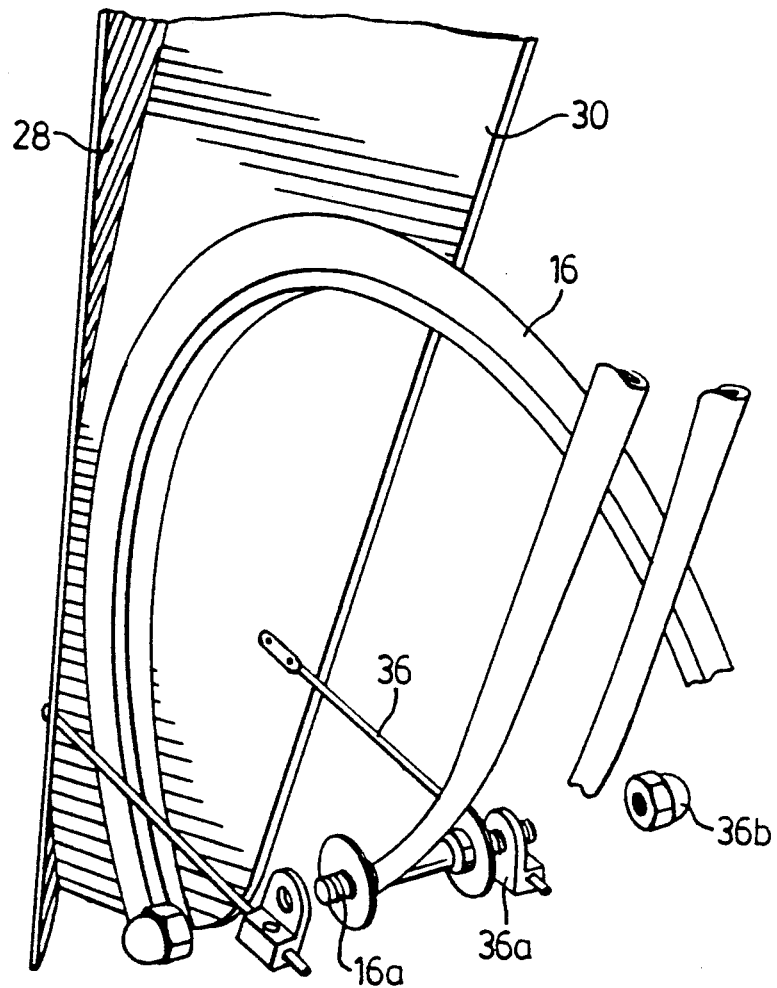
FIG. 4 is a fragmentary assembly view of a portion of the bicycle illustrated in FIG. 1.
Figure 5:
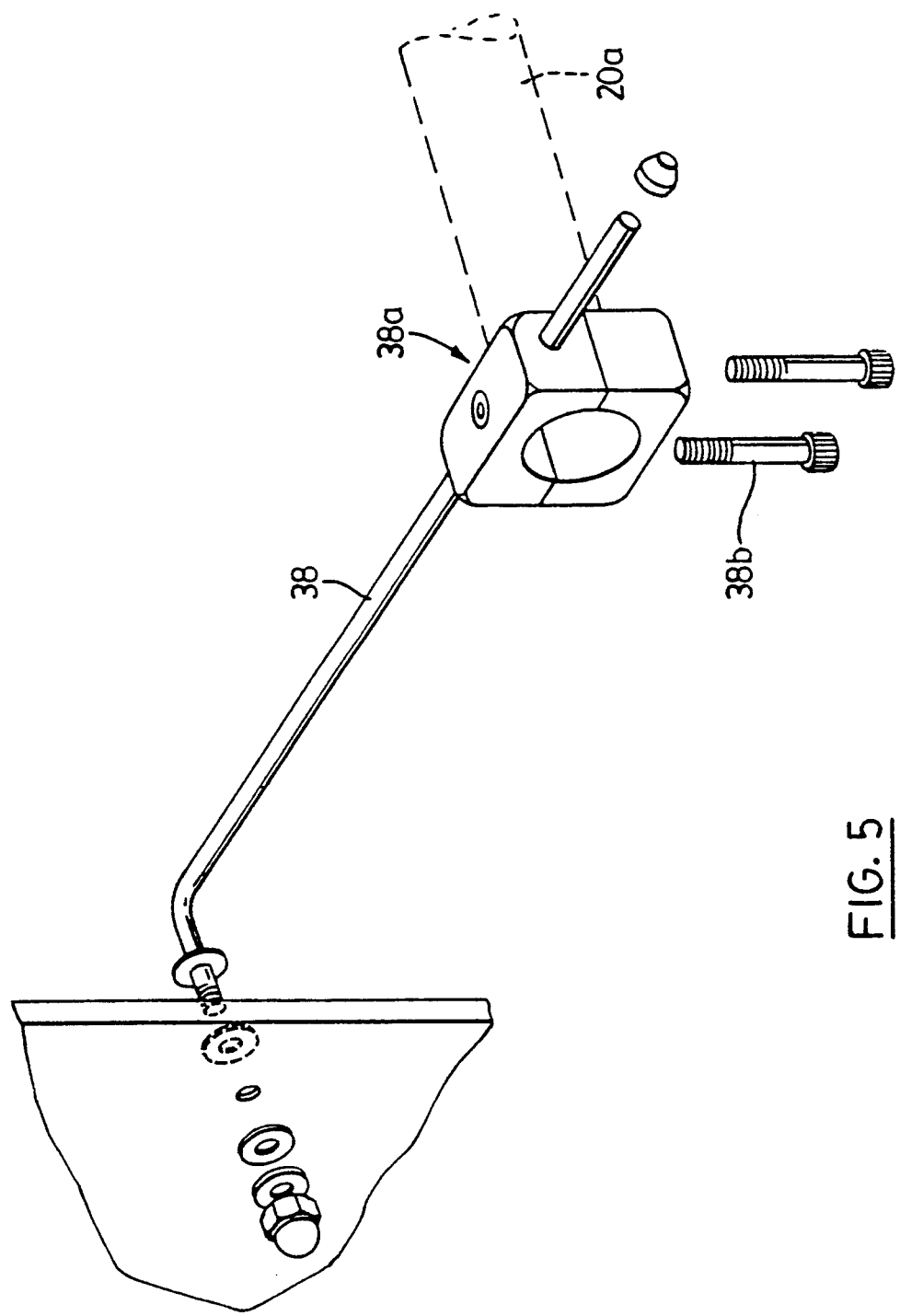
FIG. 5 is a fragmentary assembly view of yet another portion of the bicycle illustrated in FIG. 1.
Figure 6:
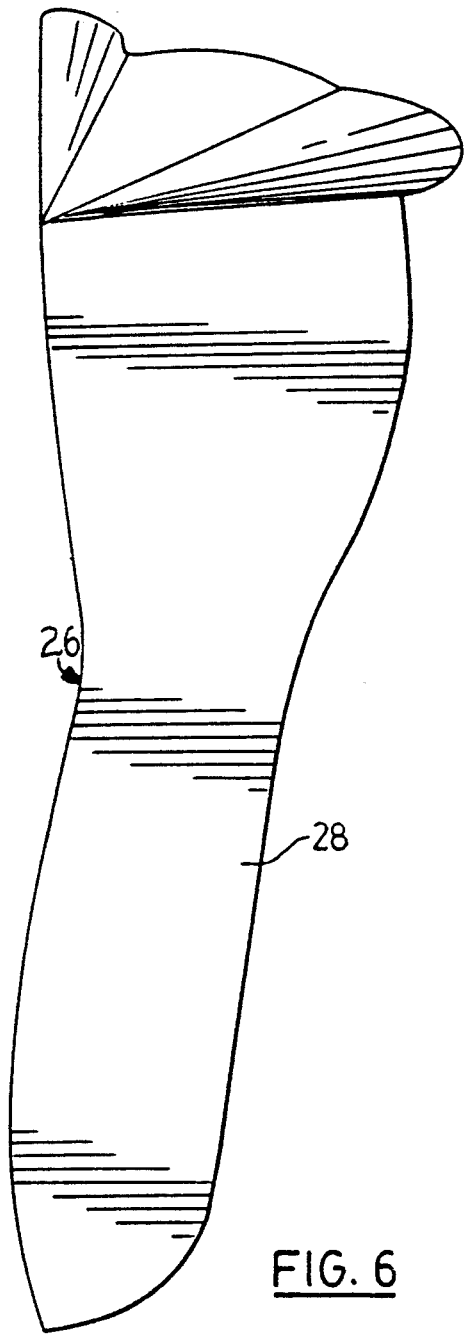
FIG. 6 is a perspective view of another portion of the bicycle illustrated in FIG. 1.
Figure 7:
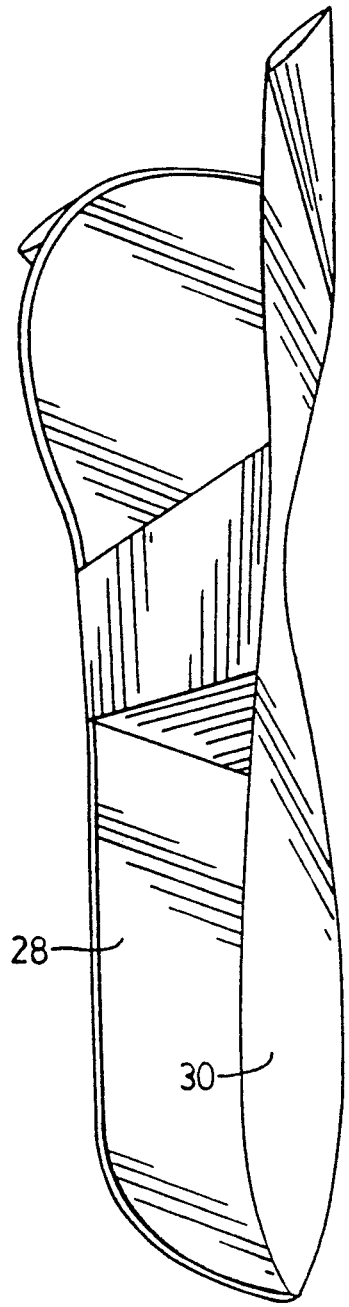
FIG. 7 is another perspective view of the portion illustrated in FIG. 6.

As shown in FIG. 2a, the two walls 28, 30 are separated by an angle 'v', which is preferably about 70 degrees. However, the angle may be different and will depend on the dimensions of the bicycle 10, the characteristcs of the shroud 24 and the like.

The fact that the fairing 22 extends below the wheel 16 enables the fairing 22 to reduce the friction caused by the air inside the hub of the wheel 16 and through the forked steering column 18. This may reduce the necessity of discs commonly attached to the spokes to reduce this friction.

Furthermore, the use of the two outwardly extending walls 28, 30 permits the fairing to function as a sail should the cyclist encounter a tail wind.

The relatively thin walls 28, 30 of the shroud 24 can be formed using traditional forming techniques including plexiglass. This material is preferred because of its reasonable degree of transparency, thereby permitting the cycliest to operate the bicycle 10 while viewing the road through the shroud 24. However, the shroud 24 may also be fabricated from composites including graphite reinforced plastics which are both strong and light. The lighter the shroud 24, the more suited it will be to the bicycle 10.

Figure 9:
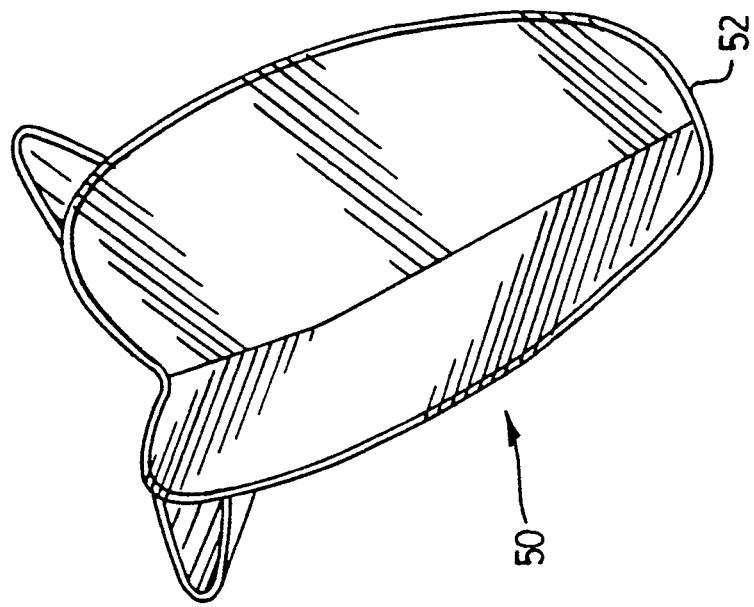
FIG. 9 is another perspective view of the portion illustrated in FIG. 8.
Figure 8:
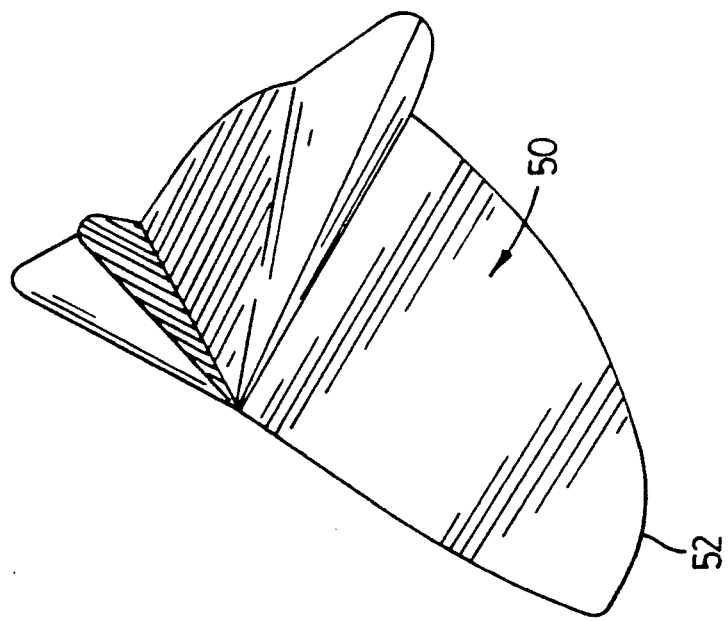
FIG. 8 is a perspective view of an alternative to the portion illustrated in FIG. 7.

Referring to FIGS. 8 and 9, an alternative shroud 50. As shown in FIG. 1, the leading edge of the shroud 50 has a leading edge that is generally aligned with the forwardmost point of the front wheel. The shroud 50 may have a lower edge 52 that is still in front of the front wheel but higher than that shown in the previous embodiment. The proportions of the shroud may be better seen by the chain-dotted lines in FIG. 1. The shroud 50 is suitable for fairings used on conventional bicycles known in the sport as 'mountain bikes'.

I claim:

1. A fairing for a bicycle of the type having a front wheel, said front wheel having a lowermost point, a forked steering column and a pair of handle bars, said fairing comprising a shroud, said shroud having a leading edge and a pair of walls extending rearwardly and outwardly from said leading edge, said leading edge extending from a region near said handle bars to a region near the lowermost point of said front wheel, said shroud having a sufficient height to shield the head of a rider in one position and a lower edge that is sufficiently low to shield the front wheel, thereby reducing the aerodynamic friction encountered by said bicycle, wherein each of said walls has a rear edge, said fairing further comprising a central wall extending between and joined with the rear edge of each of said walls, thereby to reinforce said fairing.

2. A fairing as defined in claim 1 further comprising a bottom wall panel which is joined to each of said walls and central wall, thereby to form a carrying pocket therewith.

3. A fairing as defined in claim 1 further comprising a pair of mirror shrouds each extending laterally outwardly from a respective wall of said shroud.

4. A fairing for a bicycle of the type having a front wheel, said front wheel having a forwardmost point, a forked steering column and a pair of handle bars, said fairing comprising a shroud, said shroud having a leading edge and a pair of walls extending rearwardly and outwardly from said leading edge, said leading edge being generally aligned with said forwardmost point, said shroud having a sufficient height to shield the head of a rider in 'one' position and a lower edge that is sufficiently low to shield the front wheel, thereby reducing the aerodynamic friction encountered by said bicycle; and a pair of mirror shrouds each extending laterally outwardly from a respective wall of said shroud.

* * * * *